United States Patent
Allanic et al.

[11] Patent Number: 6,110,409
[45] Date of Patent: Aug. 29, 2000

[54] RAPID PROTOTYPING PROCESS AND APPARATUS

[76] Inventors: André-Luc Allanic, 5, Place des Vosges, 54000 Nancy, France; Jean-Philippe Schaeffer, Maison Forestiére, 54700 Atton, France

[21] Appl. No.: 09/091,288
[22] PCT Filed: Jan. 2, 1997
[86] PCT No.: PCT/FR97/00001
§ 371 Date: Jun. 16, 1998
§ 102(e) Date: Jun. 16, 1998
[87] PCT Pub. No.: WO97/25194
PCT Pub. Date: Jul. 17, 1997

[30] Foreign Application Priority Data

Jan. 3, 1996 [FR] France ................................... 96 00107

[51] Int. Cl.⁷ ............................. B29C 35/08; B29C 41/02
[52] U.S. Cl. ......................... 264/401; 264/308; 264/497; 425/174.4; 425/375
[58] Field of Search ..................... 264/308, 401, 264/497; 425/174.4, 375

[56] References Cited

U.S. PATENT DOCUMENTS

| | | | |
|---|---|---|---|
| 5,204,124 | 4/1993 | Secretan et al. | 425/145 |
| 5,204,823 | 4/1993 | Schlotterbeck | 700/120 |
| 5,780,070 | 7/1998 | Yamazawa et al. | 425/174.4 |

FOREIGN PATENT DOCUMENTS

| | | |
|---|---|---|
| 431 924 A2 | 6/1991 | European Pat. Off. . |
| 484 182 A1 | 5/1992 | European Pat. Off. . |
| 554 033 A1 | 8/1993 | European Pat. Off. . |
| 93 19 405 U | 5/1994 | Germany . |
| WO 93/25377 | 12/1993 | WIPO . |

*Primary Examiner*—Leo B. Tentoni
*Attorney, Agent, or Firm*—Pollock, Vande Sande & Amernick

[57] ABSTRACT

An apparatus for rapid prototyping is provided. The apparatus includes a container containing raw material. A working field is defined in the container. A transformation inducing device is arranged above the container. A plate is provided within the container and is movable with respect to the container to move raw material which has been transformed. A least two doctor blades, which are movable over the working field, are provided. The doctor blades are moved via drive elements. At least one of the doctor blades is arranged to create a shadow effect on a shadow region of the working field. The two doctor blades are arranged with respect to each other such that a portion of the working field between the doctor blades and bounded by a shortest closed and continuous contour containing the shadow region is not affected by the shadow effect. This portion of the working field between the doctor blades is ready to undergo transformation after being passed over by only one of the doctor blades.

22 Claims, 8 Drawing Sheets

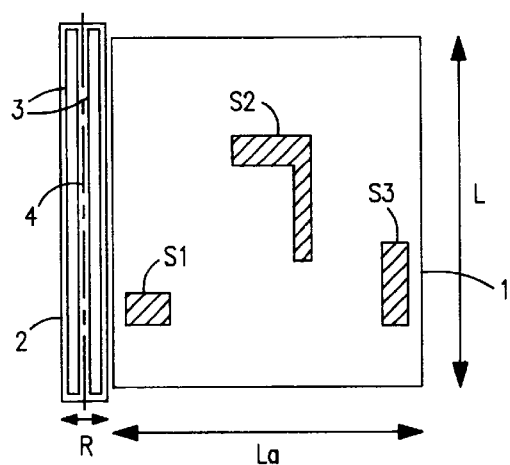
FIG. IA
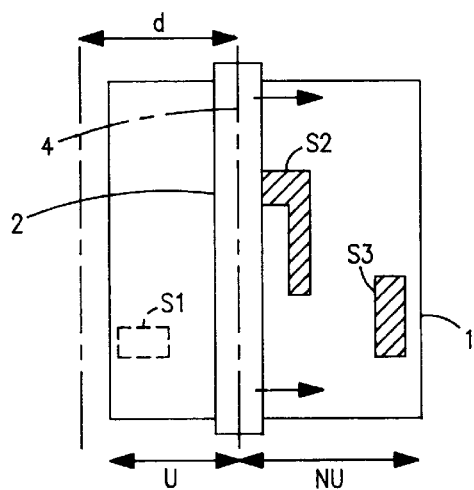
FIG. IB
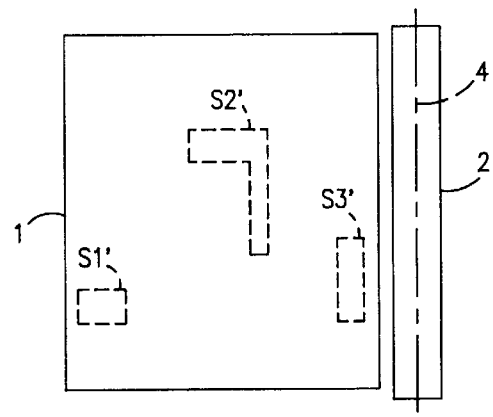
FIG. IC

RAPID PROTOTYPING PROCESS AND APPARATUS

BACKGROUND OF THE INVENTION

It is known to produce industrial components or articles automatically by the transformation of successive layers of raw material from a first state into a second state using computer information representing their shape. Machines using this principle, called Rapid Prototype machines, operate in most cases by repetition of a cycle comprising the following steps:

- a covering phase during which the stack of layers already produced during the previous steps is covered by a layer of non-transformed raw material;
- a phase of partially transforming the new layer by means of a device which emits electromagnetic radiation or particles of matter in the direction of that face of the layer which is not in contact with the previous layers.

International Application PCT WO 93/25377, for example, describes a rapid prototyping machine using the action of light radiation to partially solidify successive layers of liquid resin contained in a tank. The transformation-inducing device consists of a light generator and of an optical system which makes it possible to direct the photons emitted by tip light generator onto a portion of the free surface of the liquid corresponding with the section of the component to be produced. After each transformation phase, a support integral with the layers already partially solidified is moved vertically by a motor-driven system in order to reduce the height of the component being created with respect to that of the free surface of the liquid. Very often this movement is not sufficient to cover the parts that have just been solidified with the liquid resin and to ensure sufficient flatness of the free surface of the liquid to be able to carry out the next transformation phase. This is why a mechanical component of elongate shape, called a doctor blade, the lower part of which is in contact with the resin, is moved, in an approximately horizontal movement, by a motor-driven mechanical device, to progressively sweep over the entire surface accessible to the transformation-inducing device and to obtain the desired covering and desired flatness before moving on to new transformations. All the components of the machine are controlled by a computer, using computing data which is generated (by software processing) from the initial data and which determines the shape of the components to be produced.

Document PCT WO 93/25377 proposes various embodiments of the doctor blade; in particular, in FIG. 13 of that document, a doctor blade is described which consists of a rigid support coming into contact with the resin, by means of a plurality of flexible films called moisteners. Application EP-A-0,484,182 also contains a description of a doctor blade: this doctor blade consists of two rigid supports arranged parallel and lying close to each other, to which are fixed brush elements which come into contact with the resin via their lower part.

The type of transformations carried out in the context of rapid prototyping machines is not limited to photopolymerization or photocrosslinking of liquid resins. For example, cutting sheets of paper or agglomerating powders (plastic powders, metal powders, powder blends, etc.) using a laser are techniques commonly used for producing components in rapid prototyping. Rapid prototyping processes also exist which, instead of using light, operate by the addition of material. Mention may be made, for example, of the process developed at M.I.T. and described in the work "Rapid Prototyping & Manufacturing—Fundamentals of Stereolithography (Paul F. Jacobs, published by "Society of Manufacturing Engineers", page 409), in which the local solidification of layers of ceramic powder is carried out by the addition of an aqueous binder in the form of droplets expelled by nozzles.

Despite the wide variety of materials used, of types of transformation, of devices for carrying out the transformations and of devices for carrying out the covering phases, it is possible, however, to identify a few characteristics common to the great majority of currently operational rapid prototyping machines.

This is because material transformations are always induced, for reasons of physical accessibility, via the so-called "free" face of the layer being treated (as opposed to the so-called "hidden" face which is in contact with the previous layer). In theory, it is possible to perform transformations over the entire surface defined by the free face, but very often the device used for carrying out the local transformations makes it possible, because of its construction, to have access only to one portion of this free face, which in the rest of the present description will be called the "working field".

Another characteristic common to the majority of rapid prototyping machines is the use of a doctor blade even in the case of machines using the technique for agglomerating powders or for cutting sheets of paper. As a general rule, the doctor blade is in the form of an assembly of mechanical components of elongate shape, generally approximately rectilinear, which may or may not perform their own movement, coming into direct or indirect contact (for example by brush elements) with the raw material lying near the free surface. The assembly is set in motion by a motor-driven device approximately parallel to the free surface of the raw material. In order to put a new layer in place over the entire working field, it is necessary to make the doctor blade follow a path whose amplitude is sufficient to sweep over the major part of the working field.

The transformation-inducing device does not always allow electromagnetic radiation or particles to be emitted simultaneously in the direction of the set of points making up the working field. This is because, for example in the case of a device using a laser beam coupled to a deflection system by galvanometer mirrors, the transformations are carried out by directing the movement of the point of impact of the laser beam on the working field in order to produce a line of successive vectors, the set of which corresponds to the geometry of the cross section to be transformed. In contrast, when a device based on the principle of modern video projectors, i.e. consisting of a lamp, an optical device and a dynamic mask, is used, it is possible to illuminate the entire working field simultaneously as long as, however, the mechanical elements of the doctor blade do not act as an obstacle to the incident photons, in which case a shadow is cast on the working field. This shadow effect, although fortuitous, runs the risk of disturbing the action of the transformation-inducing device, even in the case of the line of successive vectors, with the consequence of creating substantial defects in the components produced. However, in most machines, all the degrees of freedom of the doctor blade and of the transformation-inducing device are such that suitable synchronization of the control of these members is essential in order to avoid damage likely to occur because of the shadow effect. When it is particles of matter which are emitted, there isn't a real "shadow" effect in the normal meaning of the term, nevertheless, for reasons of uniformity in the terminology, we will continue in the rest of the description to speak of the constraint due to the "shadow effect" even if the doctor blade does not, in this case, constitute an obstacle to light radiation but an obstacle to a flux of matter particles.

U.S. Pat. No. 5,204,823 describes a rapid prototyping machine which eliminates the shadow effect, by rendering the doctor blade and the device for carrying out transformations integral. However this solution means that the transformation-inducing device has to be mobile, which is incompatible with (or too expensive for) most common light sources and optical systems.

The solution most widely adopted for managing the shadow effect consists of carrying out a sequential succession of transformation phases and of covering phases, the doctor blade being at rest during the transformation phases in a position such that the entire working field can be accessed by the transformations-inducing device, and no transformation taking place when the doctor blade is moving. In general, the path of the doctor blade during manufacture is a forward-and-back cycle between two rest positions which are opposite each other with respect to the working field. For each covering phase, the doctor blade performs a forward movement from one of the rest positions to the other, thus acting on the entire working field.

Such a manner of operation certainly has the advantage of being very simple to implement, but constitutes a major handicap in terms of the machine's productivity and of operating costs. This is because, despite the constant efforts by manufacturers, the maximum speed of movement of the doctor blade remains relatively low, because of constraints associated with the rheological behavior of the raw materials, which generates a minimum duration of the covering phase. This maximum speed is of the order of a few centimeters per second, which means, for example, for a square working field of 500 mm a side, a duration of each covering phase of the order of a few seconds to a few tens of seconds. However, in order to produce components having an average volume corresponding to a cube of 300 mm a side with an acceptable surface finish, thousands of layers have to be put into place and, consequently, whatever the efficiency of the transformation-inducing device, several hours of operation by machine are necessary. In addition, for example in the case of the use of lamps or lasers, the photons are emitted continuously throughout the duration of the manufacture, since the lifetime of sources of this type when operated discontinuously is greatly reduced, resulting in a much greater energy cost than that corresponding to the effective use of all the light energy.

The relative duration of the covering phases with respect to that of the transformation phases depends on many parameters (reactivity of the raw material, power of the transformation-inducing device, size of the working field, shape of the components, etc.), but as a general rule these two durations are of the same order of magnitude, which results in an energy efficiency and a productivity limited to approximately 50% of the theoretical potential. If more efficient devices are employed for carrying out the transformation phases, the maximum time saving to be hoped for in the total manufacturing time is therefore 50% (the duration of the covering phases cannot be shortened), which is relatively negligible compared with the drop in yield which results therefrom.

SUMMARY OF THE INVENTION

It is therefore necessary to find a novel process and a novel device allowing the duration of the covering phases to be very substantially reduced. The object of the invention is to provide a process of this type and to provide a novel device for replacing the conventional doctor blade, this device furthermore having the advantage including a plurality of conventional doctor blades, the performance characteristics of which are known and proven.

As a consequence, the subject of the present invention is a rapid prototyping process for the production of industrial components by the transformation of successive volumes of raw material from a first state into a second state by means of a device which induces the transformation. The process includes a repetition of a cycle comprising the following steps:

a phase of transforming the raw material in at least part of a working field by means of the transformation-inducing device, a phase of covering the transformed material with untransformed material, the covering phase using at least one doctor blade set in motion in order to carry out the various covering phases, the transformation-inducing device being arranged in such a way that, at a given instant, the doctor blade (or at least one of the doctor blades) prevents the device from producing transformations in at least one of the parts of the working field by causing a shadow effect in a region called a "shadow region", characterized in that, at least at a given instant t of a given cycle, the transformation-inducing device is made to act so as to produce a transformation in at least one region of the working field within that portion of the working field which is bounded by the shortest closed and continuous contour containing the set of working-field points affected by the shadow effect at the instant in question. The doctor blade(s) is (are) then moved so that the shadow effect at least partially frees the shadow region at the instant t in question, and in that the doctor blade(s) undergoes (undergo) a succession of transformations and of movements in order to complete the cycle in question.

In a first embodiment, the transformation-inducing device emits at least one type of electromagnetic radiation in order to transform the raw material, for example coherent or incoherent light radiation or a beam of electrons, X-rays or γ-rays.

In a second embodiment, the transformation-inducing device emits particles of matter in order to transform the raw material, for example adhesive, a catalyst or water.

For the two embodiments mentioned above, it is preferred for the raw material, in its first state, to be in the form of liquid, paste, sheets or powder of greater or lesser fineness.

Provision may also be made so that, at least at a given instant in a cycle, the transformation and covering phases are carried out at least partly simultaneously.

It is also possible, during manufacture, to change the relative geometrical arrangement of the doctor blades.

Advantageously, the volume of the component to be manufactured is decomposed either by subdividing each complete section of the component into elementary parts, on each of which an elementary volume is produced in a single transformation phase, or by dividing a complete section of the component into several subsections, each subsection comprising a plurality of elementary parts, the elementary parts of the various subsections being imbricated in the complete section and an elementary volume being produced in line with each elementary part by a single transformation phase. All the elementary volumes of the same subsection are produced by a single transformation phase and at a time different from that at which the elementary volumes of another subsection are produced, in order to imbricate the elementary volumes of the various subsections in a direction perpendicular to the section of the component.

Advantageously, software taking into account the shape of the component is used to optimize the manufacture.

The subject of the invention is also a device for implementing the process defined above, this device comprising:
- a device inducing the transformation of the raw material,
- optionally, a container for containing the raw material,
- means for moving the already transformed volumes with respect to the working field,
- means for carrying out the covering phases using one or more doctor blades, the doctor blade(s) being set in motion approximately parallel to the working field during the covering phases by means of guiding and driving means, characterized in that the geometry and the degrees of freedom of the doctor blade(s) ensure that, at least at one instant, the shadow effect corresponding to the doctor blade(s) is such that there exists, within that portion of the working field which is bounded by the shortest closed and continuous contour containing the set of working-field points affected by the shadow effect at the instant in question, at least one region not affected by the shadow effect. The region is ready to undergo a transformation following a covering phase.

In a preferred embodiment of the device according to the invention, the transformation-inducing device includes at least one lamp combined with at least one dynamic mask, i.e. computer-controllable and operating in transmission or reflection mode.

In another embodiment, at least two doctor blades of approximately rectilinear shape are arranged parallel during at least one part of a manufacturing cycle and are driven simultaneously by the same motor.

In another embodiment, a plurality of doctor blades of rectilinear shape arranged in the form of a star are used.

Provision may be made for the doctor blade, or at least one of the doctor blades, to be set in motion along a closed path traveled without reversing direction.

It is also possible to use at least two doctor blades which can be set in motion independently.

In a variant, in which the transformation-inducing device is an electromagnetic radiation emitter, mechanical components opaque to the radiation are used, the mechanical components causing a shadow effect which at least partially coincides with the movements of the doctor blade(s).

In another variant, the device includes a control means for controlling the transformation phases in order to take into account the regions to be masked or to be illuminated.

According to a first way of implementing the invention, corresponding in particular to FIGS. 2A and 2B, a working field of rectangular shape may be decomposed into complementary strips of rectangular shape, each being able to contain the set of points affected by the shadow effect caused by a conventional doctor blade of rectilinear shape at a given instant. A plurality of rectilinear doctor blades, which are approximately parallel to each other, are arranged so as to obtain an alternation of strips entirely usable for carrying out transformations (i.e. not containing any point affected by the shadow effect) and of strips partially affected by the shadow effect. Under these conditions, it is possible to carry out transformations over the entire portion of the working field comprising the set of usable strips. Next, all the doctor blades are moved simultaneously in order to obtain a new arrangement such that the strips partially inaccessible at the previous step become accessible and, conversely, the strips entirely accessible at the previous step become partially inaccessible. In this way, it is possible to carry out transformations over the entire portion of the working field comprising the set of strips rendered usable. The doctor blades are then moved again, in order to adopt the initial arrangement once again. This series of operations allows transformations to be carried out over the entire working field, despite the shadow effect produced by the plurality of doctor blades employed, but in two successive steps instead of a transformation phase in a single step. Likewise, the covering phase is carried out in two steps, when the doctor blades are moved. Thereafter, it is sufficient to repeat this cycle of operations as many times as is necessary for producing the component.

The advantage of this process is that it allows a considerable reduction in the amplitude constraint on the path to be followed by each doctor blade in order to perform a manufacturing cycle, compared with that required by the use of a single doctor blade. However, since this path is followed simultaneously by all the doctor blades, it is clear that, for the same speed of movement, the duration of the covering phases is substantially reduced compared with the conventional process.

Another way of implementing the invention, corresponding in particular to FIG. 3, uses a plurality of doctor blades in the form of a star in the case of a working field of circular shape. In this case, the process cuts up the working field into complementary sectors, arranges the doctor blades so as to obtain an alternation of usable sectors (no shadow effect) and of partially unusable sectors and operates in a manner similar to that described in the case of a working field cut up into complementary strips.

A variant, corresponding in particular to FIG. 4, uses a guiding and driving device for moving the doctor blades in a closed path traveled without direction reversal, the doctor blades being arranged among themselves so as to allow the process according to the invention to be implemented.

The additional cost caused by the increase in doctor blades, mentioned in the above examples, is small (in a conventional machine, the cost of a doctor blade is low compared with the other components), this being the case as it is not necessary to increase the number of guiding members and corresponding motors. This is because all the doctor blades may easily be connected to a common mechanical component, the component being connected to a single motor, and the doctor blades being guided using a common guiding member. When several doctor blades are fastened together by means of a mechanical linkage (which may be rigid or flexible), the mechanical system thus formed may be regarded as constituting a special single doctor blade.

According to the invention, it is possible, for example, to use two doctor blades in the form of a comb which can be set in motion independently. As described in FIG. 5, such a device allows transformation phases and covering phases to be carried out simultaneously.

Up until now, in the present description, it has been envisaged to control the device in order to carry out the transformations by taking into account the shadow effect caused by elements of the device for performing the covering phases. However, if mechanical elements opaque to the radiation emitted by the transformation-inducing device are used, making it possible to cause a shadow effect synchronized with that caused by the doctor blade(s) (for example by integrating said mechanical elements with the doctor blades), it may be possible carry out the transformation phases in a conventional manner, the decomposition into successive volumes being caused by the various positions adopted by the opaque elements during manufacture. The latter variant has the advantage of making it simpler to control the process.

According to the invention, it is worthwhile producing a device for carrying out the covering phases which makes it possible to modify, during manufacture, the shape of the doctor blade(s) or, when several doctor blades are used, the relative arrangement of the doctor blades among themselves during manufacture. This is because this flexibility allows, by using suitable software, the management of the manufacture to be optimized depending on the shape of the component to be produced. This takes maximum advantage of the opportunity to carry out the covering steps in parallel in certain parts of the working field, while transformations are being carried out simultaneously in other parts of the working field, the parts possibly changing during manufacture depending on the geometry of the volumes to be transformed.

BRIEF DESCRIPTION OF THE DRAWINGS

In order to understand the subject of the invention better, several embodiments thereof will now be described by way of purely illustrative and nonlimiting examples, these being illustrated in the appended drawing.

In this drawing:

FIGS. 1A, 1B, 1C illustrate three steps in the process of the prior art;

DETAILED DESCRIPTION OF THE INVENTION

Figure 8:
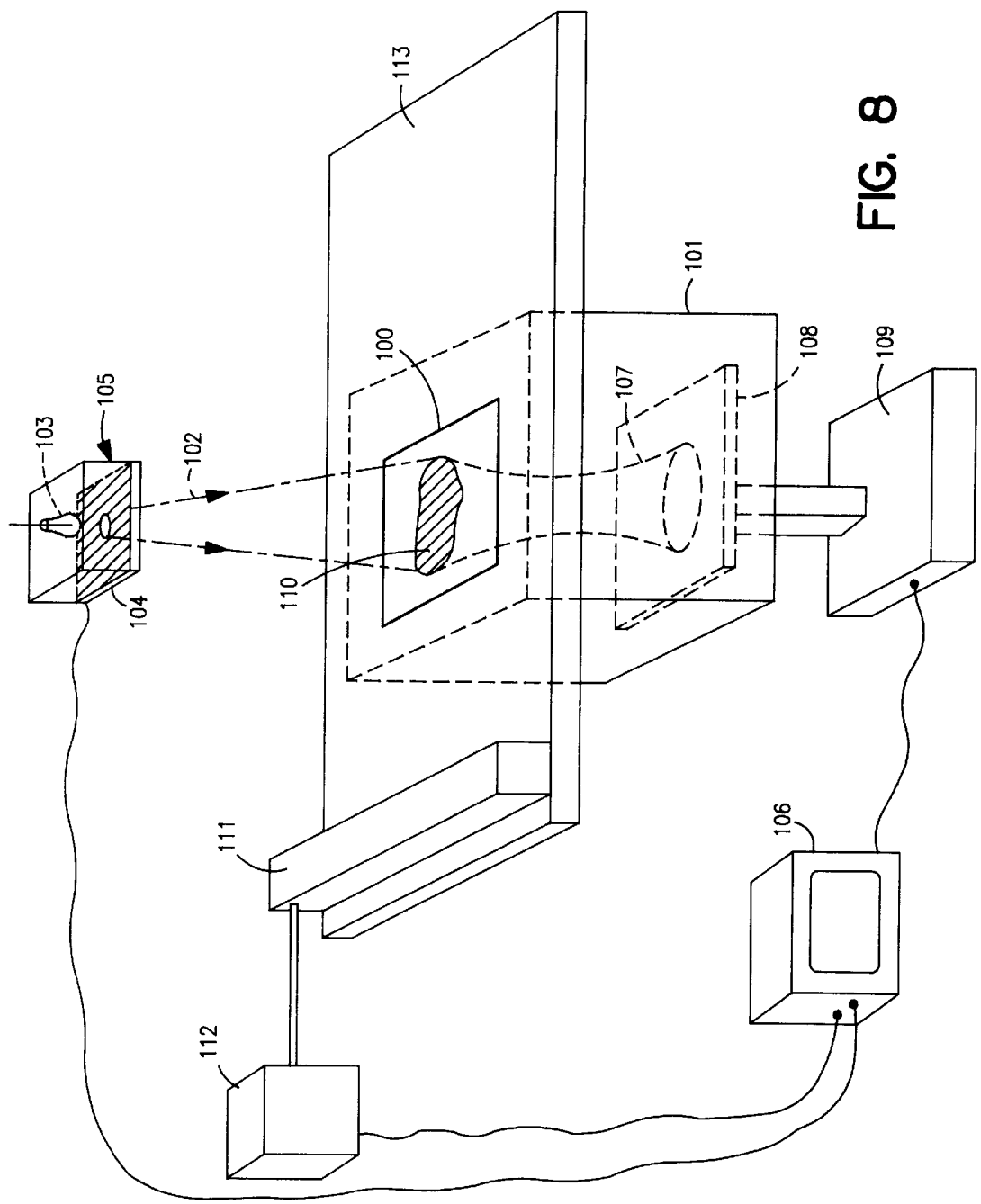
FIG. 8 illustrates, in perspective and an overall view of a machine used for implementing the invention.

In the embodiment illustrated in FIG. 8, that the rapid prototyping machine includes a container 101 in which a resin is placed, the resin being polymerizable under the action of the radiation 102 emitted by a lamp 103. The lamp 103 is associated with a mask 104 in order to constitute a transformation-inducing device 105 of the machine. The mask 104 is controlled by virtue of a computer 106 and this control determines those regions of the surface of the resin which, at each instant, are illuminated by the radiation 102 within a working field 100. The machine is intended for obtaining a component of which it is assumed, in FIG. 8, that a part 107 has already been produced; this part 107 rests on a movable plate 108, the gradual insertion of which into the container 101 is brought about, by virtue of a guiding and driving system 109, by the computer 106. The last section of the component that has been polymerized on the free surface of the resin in the working field 100 has been denoted by 110. After each polymerization of an elementary layer, the section 110 is covered, after insertion of the plate 108, by means of a translatable doctor blade 111 which spreads out the resin over the section 110; the movement of the doctor blade 111 over the plate 113 of the machine is brought about by an actuator 112 which is itself controlled by the computer 106. Such a machine, of a known type allows the process according to the invention to be implemented.

FIGS. 1A–1C illustrate, in plan view, a rectangular working field 1 of length L and width La (La<L). A single doctor blade 2 is composed of two mechanical components 3 coming into contact with the raw material. The doctor blade is of approximately rectilinear shape, so as to be parallel to one of the sides of the working field and its length is such that a movement in a direction approximately perpendicular to its mean line 4 is sufficient to cause the action of putting the desired layer in place over the entire surface of the working field.

FIG. 1A illustrates the situation during a transformation phase. The section to be produced is illustrated by the set of three hatched regions S1, S2 and S3. It should be pointed out that the doctor blade is at rest and is positioned so that none of its parts produces a shadow effect on the working field (it is assumed that the transformation-inducing device, not illustrated, lies above the working field).

FIG. 1B illustrates an instantaneous view of the period during which the doctor blade is undergoing horizontal movement in the direction of the arrows. This movement is performed parallel to the short sides of the working field; at the instant illustrated, the doctor blade has already traveled a distance d from its initial position. At this moment, the set of points in S1 (illustrated unhatched) has already undergone the action of the doctor blade, that is to say that a new layer of material has been established above the part S1 of the layer which has just been transformed, as well as also over the entire portion of the working field denoted by U in the figure and lying to the left of the doctor blade (i.e. "behind" the doctor blade with respect to the direction of movement). The doctor blade partially coincides with the region S2 which has just been transformed. It is clear that, at this instant, it is not possible to carry out the transformation of the entire next layer for two reasons:

the doctor blade 2 produces a shadow effect on a part of the working field;

on the part of the working field denoted by NU, composed, on the one hand, of a region masked by the doctor blade and, on the other hand, by the entire part of the working field lying to the right of the doctor blade (i.e. "in front of" the latter with respect to the direction of movement), the new layer of material has not yet been completely put into place.

This is why the solution generally adopted consists in continuing the movement of the doctor blade, until it reaches the position illustrated in FIG. 1C, before new selective transformations are carried out. This new rest position is such that the entire working field is to the left of the doctor blade (no shadow effect); the new section to be transformed is illustrated by the regions S1', S2', S3', the outlines of which are drawn in dotted lines. It is then possible to carry out the transformation of the new section so that the situation is again one very similar to that of FIG. 1A. After having carried out the new transformation phase, all that is required is to move the doctor blade in the reverse direction (from right to left in FIG. 1C) in order to put the next layer in place. In this illustration of the conventional sequential operation of a rapid prototyping process, it may be observed that there is a minimum distance to be traveled by the doctor blade in order to cover the entire working field: this minimum amplitude of movement is equal here to La+R, R being the width of the doctor blade.

Figure 2A:
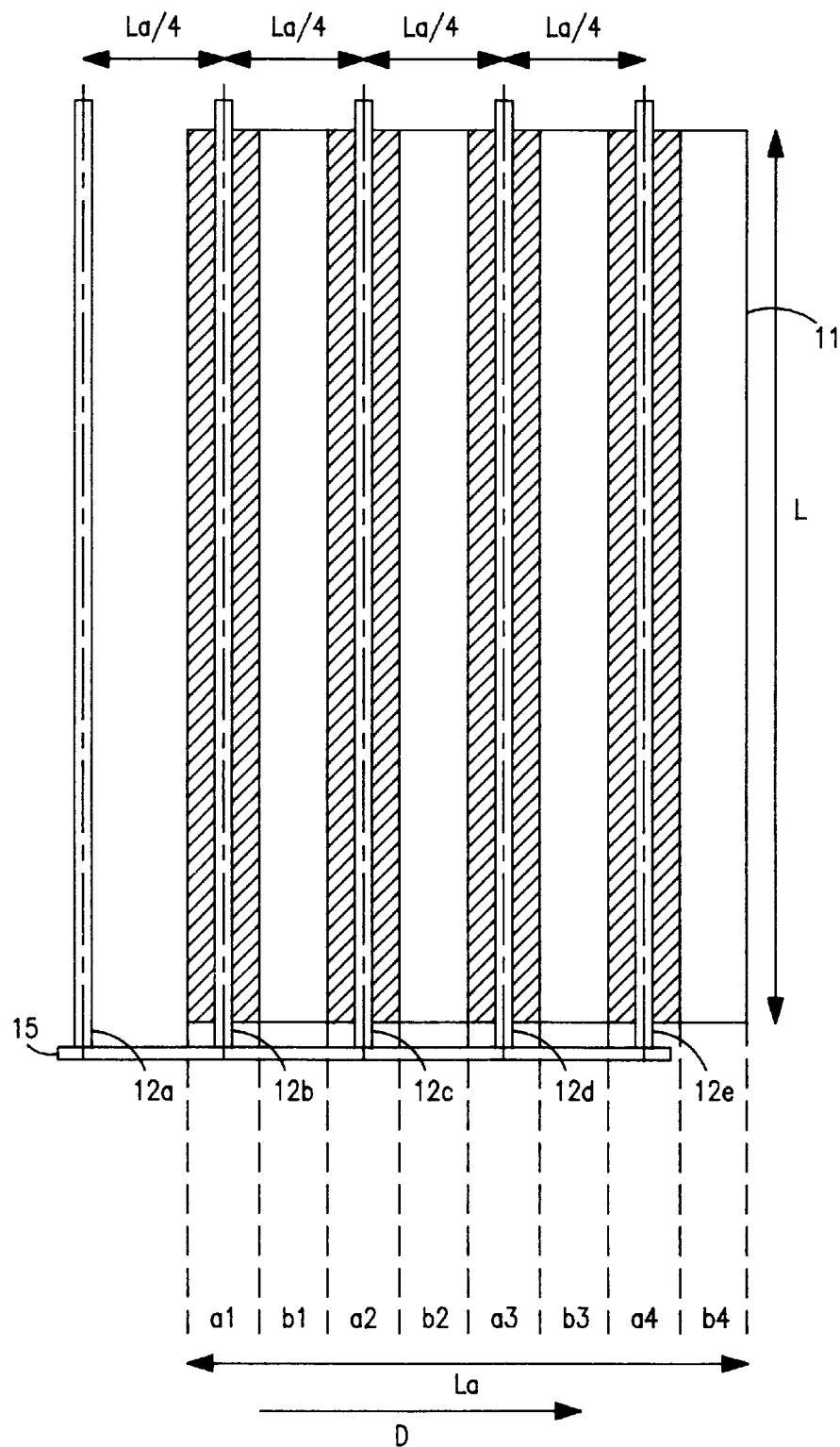
FIGS. 2A and 2B illustrate the implementation of the process using a plurality of mutually parallel rectilinear doctor blades.
Figure 2B:
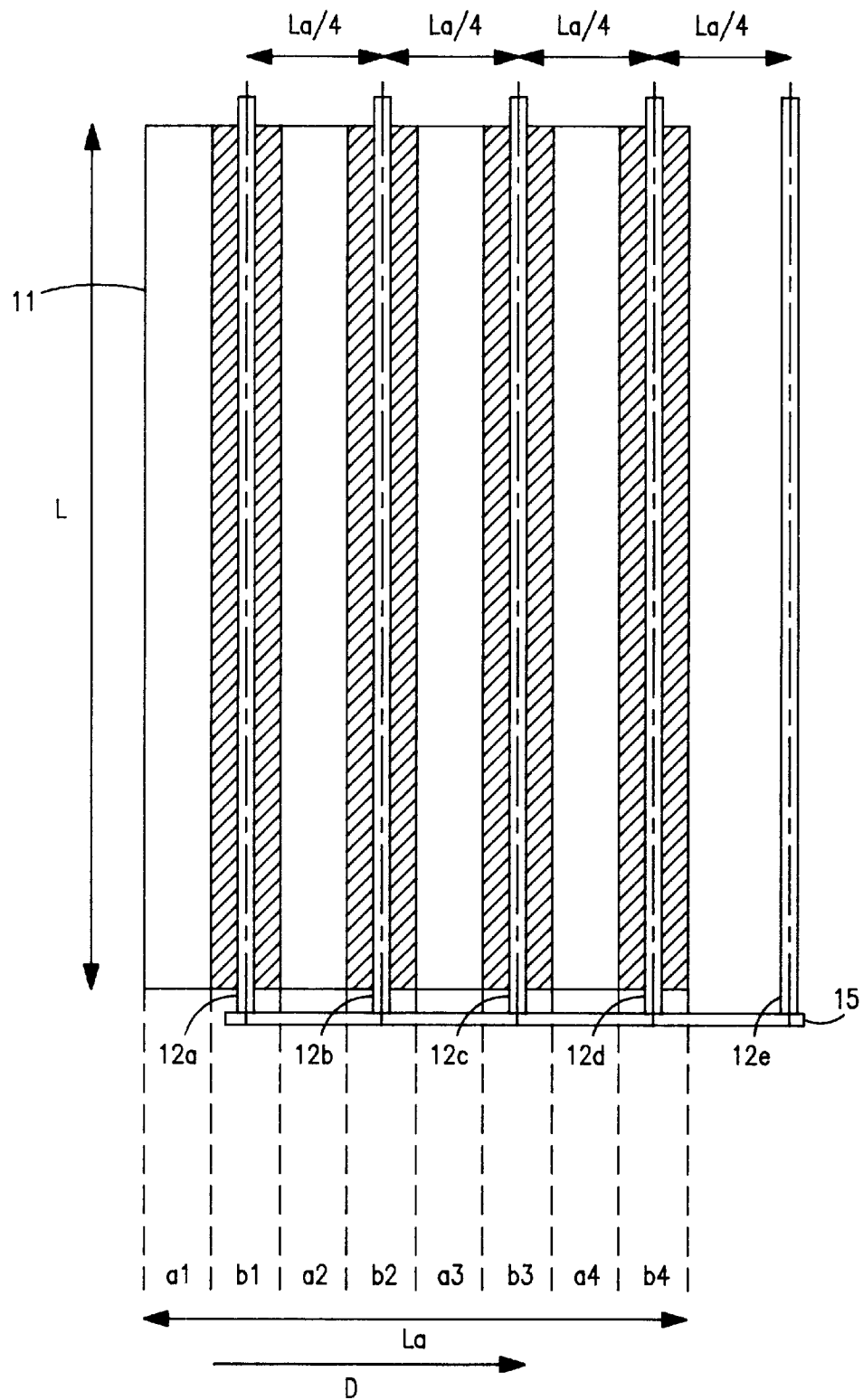

FIGS. 2A and 2B illustrate one way of implementing the process according to the invention. A plurality of rectilinear doctor blades, arranged so as to be mutually parallel, are used. The working field 11 has a length L and a width La. Five doctor blades numbered 12a to 12e are held by a connecting element 15 so that the distance between the axes of two consecutive doctor blades is La/4. The working field consists of adjacent parallel strips a1, b1, a2, b2, a3, b3, a4, b4. Initially, the doctor blades are in the position indicated by FIG. 2A, that is the doctor blade 12b is entirely contained within the strip a1, likewise 12c within a2, 12d within a3 and 12e within a4. The doctor blade 12a is outside the field 11. The strips b1, b2, b3 and b4 suffer no shadow effect while the strips a1 . . . a4 are in the shadow of the doctor blades 12b to 12e, respectively. It is therefore possible to carry out a transformation phase on the strips b1 to b4. Next, the doctor blades are moved by a distance 3 La/8 in the direction D, in order to reach the position in FIG. 2B, where 12a is entirely contained within the strip b1, 12b within b2, 12c within b3 and 12d within b4. Now it is 12e which is outside the field 11. During this movement, the doctor blade 12a carries out the covering phase for the strip a1, likewise 12b for the strip a2, 12c for a3 and 12d for a4. Again, the situation is therefore as in FIG. 2B in which the strips a1, a2, a3 and a4 have all just undergone a covering phase and are all free of any shadow effect. A transformation phase may therefore be carried out on them. Next, the doctor blade assemblies are again moved by a distance equal to 3 La/8, but this time in the opposite direction to D, so as to be again in the position of FIG. 2A in which the strips b1, b2, b3 and b4 are not subject to any shadow effect. During this movement, 12b carries out the phase of covering the strip b1, as does 12c for the strip b2, 12d for b3 and 12e for b4. The device is therefore right back in the starting position, allowing the transformation phase to be carried out on b1, b2, b3 and b4. All that is required is to repeat this cycle in order to manufacture the entire component. The ability of the process according to the invention to solve the shadow effect (which here is permanent) while remaining more effective than the conventional process is therefore well demonstrated, since the total travel of the doctor blades is twice 3 La/8; this travel is less than travel (La+R) necessary in the process of the prior art not subjected to the permanent shadow effect. It is advantageous to increase the number n of doctor blades to more than 5 in order to increase the gain further, by ensuring that R is much less than or equal to La/(2(n−1)) and by performing a total travel of 3(La/(n−1)), which is always less than (La+R) if n is greater than or equal to 4.

Figure 3:
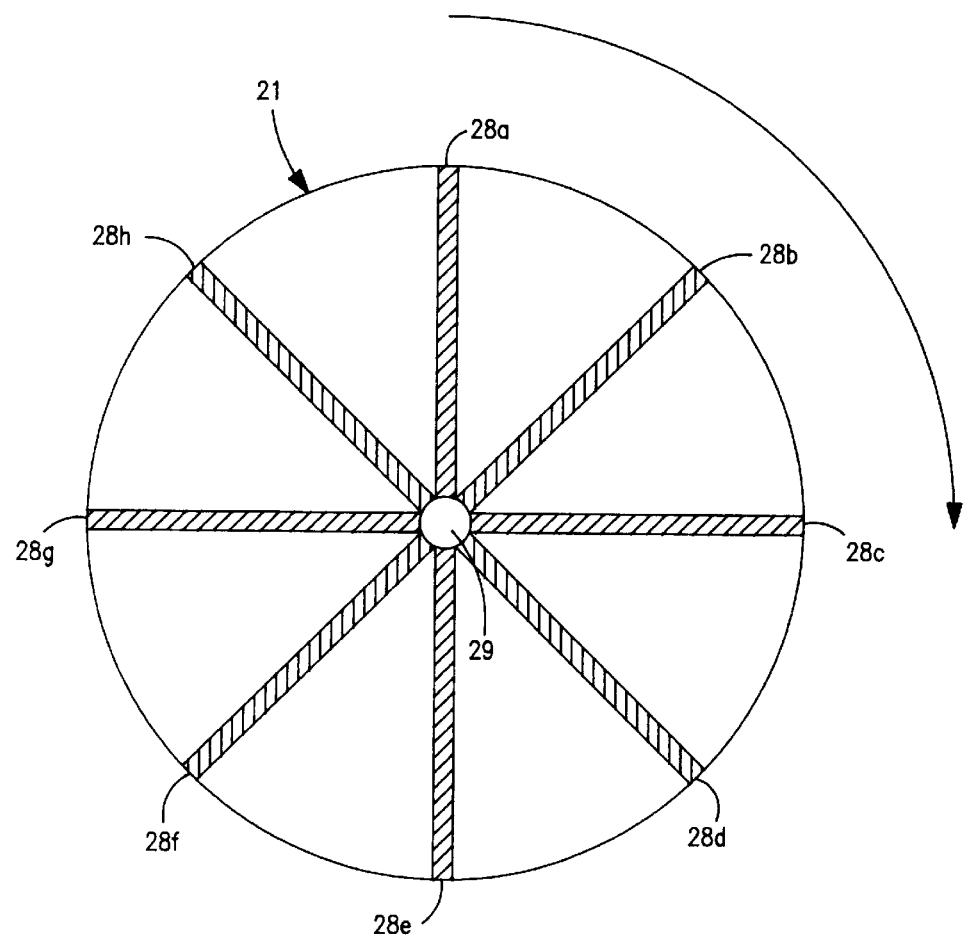
FIG. 3 illustrates an arrangement of several rectilinear doctor blades in the form of a star.

FIG. 3 shows one way of arranging several doctor blades in the case in which the working field 21 is circular. Eight doctor blades, numbered 28a to 28h, are joined together in the form of a star around a hub 29, the spindle of which is fixed to the center of the field 21. A driving device rotates the assembly 29, 28a to 28h about the axis of the hub 29, thereby making it possible to put a new layer of material in place in approximately one eighth of a revolution, instead of a complete revolution if only a single doctor blade were used. The assembly 29, 28a to 28h is a doctor blade of special shape.

Figure 4:
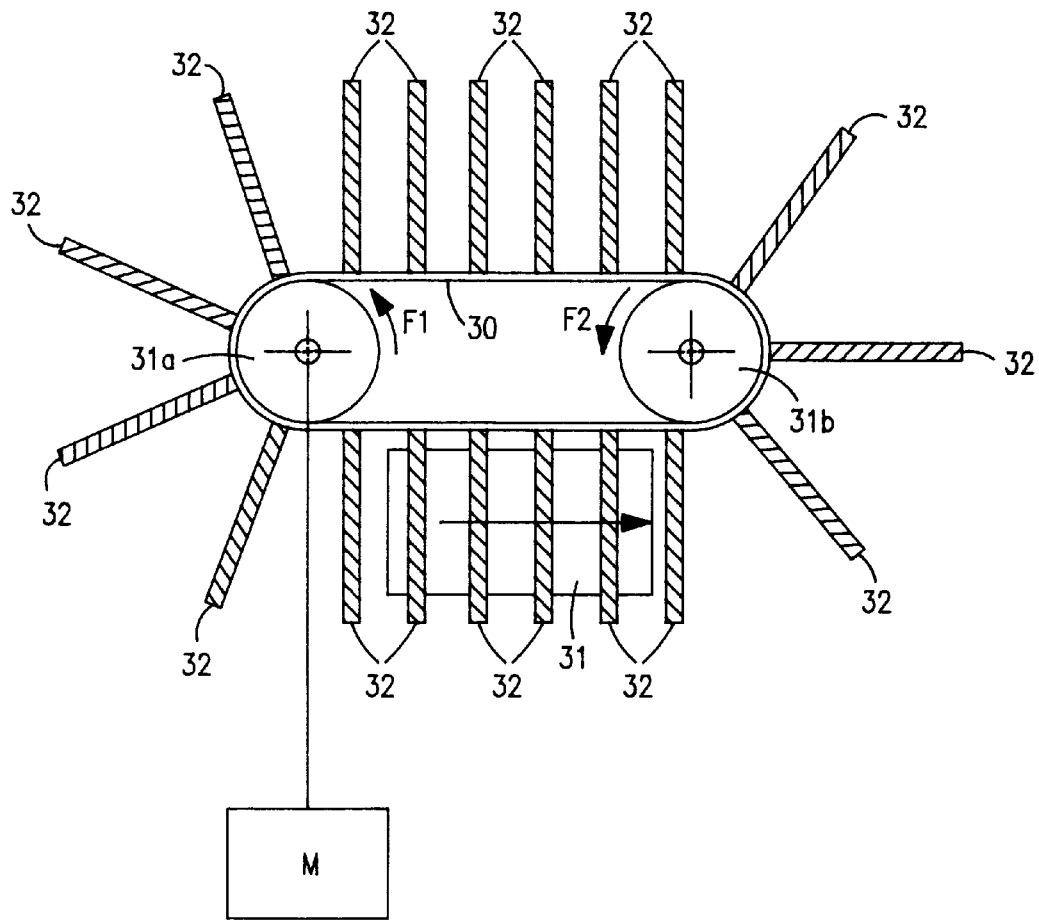
FIG. 4 illustrates a device for making a plurality of doctor blades follow a closed path without direction reversal.

FIG. 4 illustrates a device allowing a plurality of doctor blades to be set in motion along a closed path without direction reversal. The doctor blades 32 are rendered integral with each other by means of a belt 30 which is guided and driven by two pulleys 31a and 31b rotated along the direction indicated by the arrows F1 and F2. A single motor M, linked to the pulley 31a, is thus sufficient to move all the doctor blades 32 simultaneously in a closed path traveled without direction reversal. In the course of their path, the various doctor blades 32 pass successively over the working field 31, and there is always a plurality of doctor blades arranged so as to be parallel to each other and lying above the working field. Such a device therefore makes it possible to operate in a manner similar to that described in the case of FIGS. 2A and 2B.

Figure 5A:
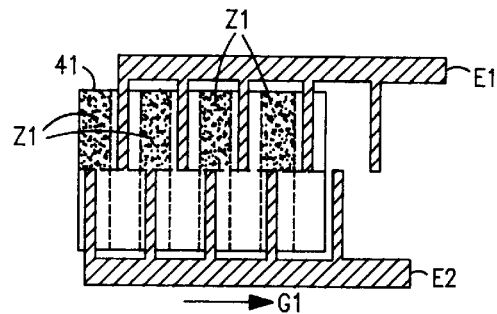
FIGS. 5A to 5D illustrate the steps in a process for manufacturing components making it possible to carry out covering phases and transformation phases simultaneously.
Figure 5B:
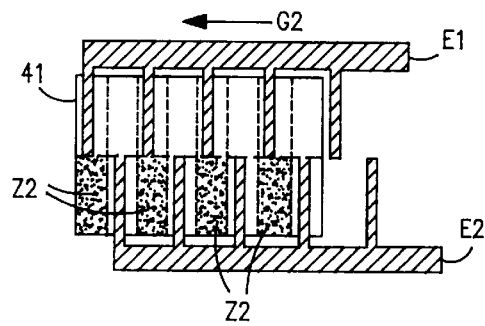

FIGS. 5A to 5B illustrate the steps of a process for manufacturing components allowing covering phases and transformation phases to be carried out simultaneously. The working field in this example is bounded by the outline 41 and is divided (dotted lines) into 16 separate and complementary tiles. Two groups of separate doctor blades (E1 and E2) arranged in the form of a "comb" are each assigned to two halves of the working field (each composed of 8 tiles). In FIG. 5A, the situation is such that E2 is moving in the direction of the arrow G1. The 4 tinted tiles denoted by Z1 are not partially masked, either by the doctor blades of E1 which are at rest or by those of E2 which are moving in the direction indicated by the arrow. It is therefore possible to carry out transformations (no shadow effect) on that portion of the field 41 depicted by the joining of the 4 tinted tiles Z1.

FIG. 5B illustrates the next step in the proposed cycle, assuming that all the transformations relating to the tiles Z1 (of FIG. 5A) have been completed and that E2 has completed its movement, so that:

E2 has reached its rest position coinciding with the position illustrated in FIG. 5B, the action of the group of doctor blades E2 in the course of its movement (during the preceding phase illustrated by FIG. 5A) has made it possible to obtain a suitable covering effect on that portion of the field 41 depicted by the 4 tinted tiles Z2. It is therefore possible to carry out transformations on the latter 4 tiles Z2 while the group of doctor blades E1 is moving (in the direction of the arrow G2), since the doctor blades of this group have a path such that they do not cause a shadow effect on the regions bounded by the 4 tinted tiles Z2.

Figure 5C:
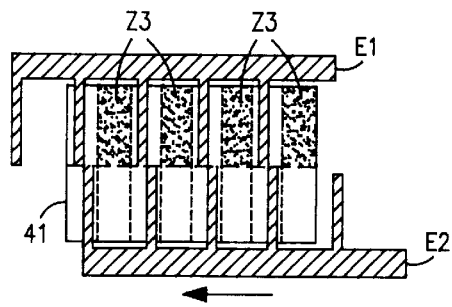
Figure 5D:
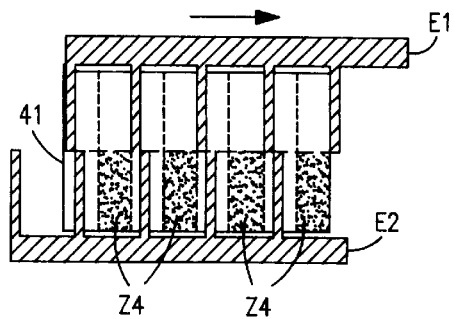
Figure 6A:
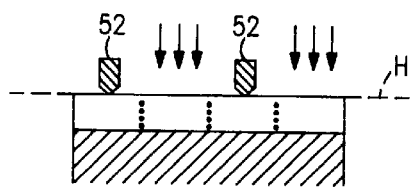
FIGS. 6A to 6E illustrate the steps in a process involving decomposition into elementary volumes.
Figure 6B:
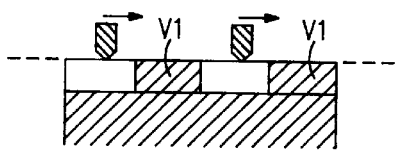

FIGS. 5C and 5D illustrate the rest of the steps to be followed, satisfying conditions similar to those of 5A and 5B, namely that one of the two combs is moving and that there is a set of 4 tiles on which it is possible to carry out transformations (Z3 in the case of 5C and Z4 in the case of 5D). It should be pointed out that steps 5A to 5D may be repeated in a cyclic manner so that, during each cycle, the entire working field can undergo transformations and the entire working field can benefit from a covering action induced by doctor blades and necessary for implementing the process.

Simultaneous covering phases and transformation phases are thus achieved, and provided that, in each of steps 5A to 5D, the duration of the transformation phase is such that the moving "comb" (E1 in the case of steps 5B and 5D, E2 in the case of steps 5A and 5C) can reach its rest position before the end of the transformation phase, the covering phases will have been carried out in parallel.

FIGS. 6A to 6E, on the one hand, and 7A to 7F, on the other hand, illustrate two ways of producing components according to the process of the invention. The successive steps (FIGS. 6A to 6E) corresponding to the production of components in which each complete section of the component is cut up into elementary parts, on each of which parts elementary volumes (V1, V2) are produced. Illustrated in FIGS. 7A to 7F is the succession of diagrams (from top to bottom) relating to the successive steps in a process corresponding to cutting-up by "imbricated incomplete sections", in which the elementary volumes created at each transformation phase are offset in a direction perpendicular to the component section in question.

The various diagrams can be understood as being vertical cross sections, in which the following appear:

hatched parts denoting the volumes of material which have already been transformed;

a dotted line (denoted by the letter H in the first step) representing the cut of the working field. Implicitly, the entire unhatched region lying beneath this line represents untransformed raw material;

doctor blades denoted by 52 and 52'. It will be noted that the shape of the doctor blades 52 is different from that of the doctor blades 52' in order to show symbolically the fact that the choice of the mode of decomposition may be linked to the type of doctor blades used.

Figure 7A:
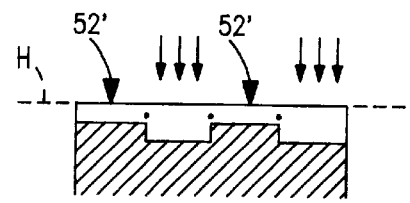
FIGS. 7A to 7F illustrate the steps in another process involving decomposition into elementary volumes.
Figure 7B:
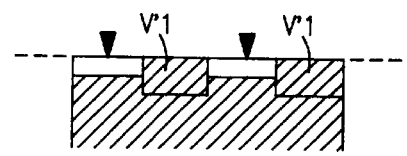
Figure 6C:
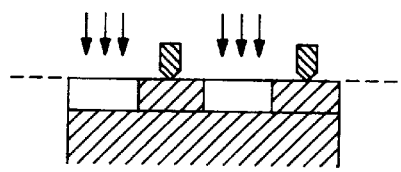
Figure 7C:
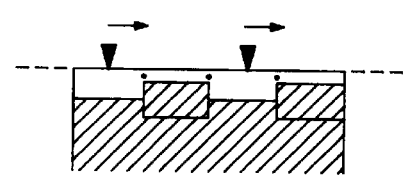
Figure 6D:
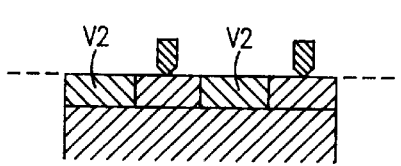
Figure 7D:
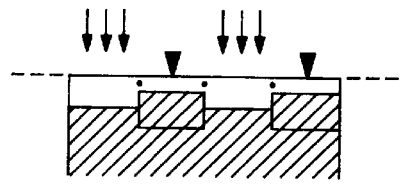
Figure 6E:
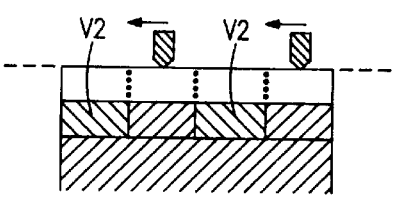
Figure 7E:
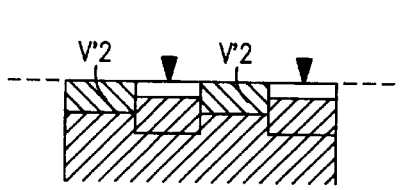
Figure 7F:
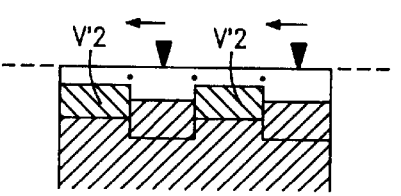

The cyclic nature of the succession of steps is suggested by the relative similarity between the diagrams of the first and last steps. The first step represents a transformation phase during which the doctor blades 52, 52' are stationary and local transformations (shown symbolically by the triple vertical arrows) are carried out. These transformations are limited to regions above which there is no shadow effect. The step in FIG. 6B and the steps in FIGS. 7B, 7C represent a covering phase. The hatched volumes V1 and V'1 following the transformations carried out during the first step are shown. The horizontal arrows (FIGS. 6B and 7C) indicate the movement of the doctor blades 52 and 52'. The step in the FIGS. 6C and 7D corresponds to a new transformation phase similar to that in the first step. The last step (FIGS. 6E, 7F) corresponds to a covering phase, in which, as for the step in FIGS. 6B, 7C, the volumes V2 and V'2 produced during the transformation phase of the step in FIGS. 6C, 7D are shown. In the step in FIGS. 6E, 7F, it will be noted that the arrangement of the volumes produced during the cycle is different:

V1 and V2 are at the same height and, by joining them together, constitute a volume very similar to that which could have been obtained by a conventional process, i.e., in fact, a horizontal section of the component;

V'1 and V'2 are not at the same height, but separately constitute a volume which can be likened to a conventional section of a component, partially produced. The "crenelation" effect which results therefrom does not prevent the desired shape of the component from being finally obtained; simply the cutting-up is slightly different from the conventional cutting-up. In this case, the sections will be referred to as "imbricated incomplete sections".

What is claimed is:

1. Rapid prototyping process for production of components by transformation of successive volumes of raw material from a first state into a second state by a transformation-inducing device, the process including a repetition of a cycle comprising:

a) covering part of a working field with raw material in the first state by moving at least one doctor blade;

b) arranging at least one doctor blade, at a given time in the cycle, to prevent the transformation-inducing device from producing transformations in at least one region of the working field by producing a shadow effect in the region;

c) transforming the raw material in at least one portion of the working field, which is bounded by the shortest closed and continuous contour containing the region affected by the shadow effect, into the second state;

d) moving the at least one doctor blade such that the shadow effect is at least partially removed from the region and the raw material in the second state is covered with raw material in the first state; and e) repeating steps b–d until the cycle is completed.

2. Process according to claim 1 wherein a plurality of doctor blades are provided and a geometrical arrangement of the doctor blades relative to one another is changed.

3. Apparatus for rapid prototyping comprising:

a device for inducing transformation of a raw material;

means for moving already transformed material; and one or more doctor blades being moveable approximately parallel to a working field in the raw material by drive and guide means, the doctor blade being arranged such that, at a given time, at least one part thereof is an obstacle which prevents the device from carrying out transformations over at least one shadow region of the working field, the doctor blade being arranged to have at least one gap allowing transformations, at the given time, over a first region lying within a portion of the working field which is bounded by the shortest closed and continuous contour containing the shadow region, the first region being ready to undergo transformation.

4. Apparatus for rapid prototyping comprising:

a container containing raw material;

a working field defined in the container;

a transformation-inducing device arranged above the container;

a plate moveable within the container for moving transformed raw material;

at least two doctor blades, the doctor blades being movable over the working field via drive elements, at least one of the doctor blades creates a shadow effect on a shadow region of the working filed, the doctor blades being arranged such that a part of the working field between the doctor blades and bounded by a shortest closed and continuous contour containing the shadow region is not effected by the shadow effect and is ready to undergo transformation after being passed over by one of the doctor blades.

5. Process according to claim 1, wherein the transformation-inducing device emits at least one type of electromagnetic radiation in order to transform the raw material.

6. Process according to claim 1, wherein the transformation-inducing device emits particles of matter in order to transform the raw material.

7. Process according to claims 1, wherein that the raw material, in its first state, is in the form of liquid, paste, sheets or powder.

8. Process according to claim 1, wherein at least at a given instant in a cycle, the transformation and covering phases are carried out at least partly simultaneously.

9. Process according to claim 1, wherein the shape of the doctor blade is changed.

10. Process according to claim 1, wherein the volume of the component to be manufactured is decomposed by subdividing each complete section of the component into elementary parts, on each of which an elementary volume is produced in a single transformation phase.

11. Process according to claim 1, wherein the volume of the component to be manufactured is decomposed by dividing a complete section of the component into several subsections, each subsection comprising a plurality of elementary parts, the elementary parts of the various subsections being imbricated in the complete section and an elementary volume being produced in line with each elementary part by a single transformation phase, all the elementary volumes of the same subsection being produced by a single transformation phase and at a time different from that at which the elementary volumes of another subsection are produced, in order to imbricate the elementary volumes of the various subsections in a direction perpendicular to the section of the component.

12. Device according to claim 3, wherein the transformation-inducing device comprises at least one lamp and at least one dynamic mask.

13. Device according to claim 3, wherein the it includes at least two doctor blades are arranged mutually parallel during at least one part of a manufacturing cycle and driven simultaneously by the same motor.

14. Device according to claim 3, comprising a plurality of doctor blades are of rectilinear shape arranged in the form of a star.

15. Device according to claim 3, wherein at least one of the doctor blades is set in motion along a closed path traveled without direction reversal.

16. Device according to claim 3, wherein the at least two doctor blades which can be set in motion independently.

17. Device according to claim 3, wherein the transformation-inducing device is an electromagnetic radiation emitter, including mechanical components opaque to said radiation, said mechanical components causing a shadow effect which at least partially coincides with the movements of the doctor blade.

18. Process according to claim 5, wherein the raw material, in its first state, is in the form of liquid, paste, sheets or powder.

19. Process according to claim 6, wherein the raw material, in its first state, is in the form of liquid, paste, sheets or powder.

20. Process according to claim 5, wherein at least at a given instant in a cycle, the transformation and covering phases are carried out at least partly simultaneously.

21. Process according to claim 6, wherein at least at a given instant in a cycle, the transformation and covering phases are carried out at least partly simultaneously.

22. Process according to claim 7, wherein at least at a given instant in a cycle, the transformation and covering phases are carried out at least partly simultaneously.

* * * * *